United States Patent
Keogh

(10) Patent No.: US 9,413,783 B1
(45) Date of Patent: Aug. 9, 2016

(54) NETWORK INTERFACE WITH ON-BOARD PACKET PROCESSING

(71) Applicant: Amazon Technologies, Inc., Reno, NV (US)

(72) Inventor: David Keogh, Wicklow (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/293,467

(22) Filed: Jun. 2, 2014

(51) Int. Cl.
*H04L 29/06* (2006.01)

(52) U.S. Cl.
CPC .................................. *H04L 63/1458* (2013.01)

(58) Field of Classification Search
None
See application file for complete search history.

(56) References Cited

U.S. PATENT DOCUMENTS

| | | | |
|---|---|---|---|
| 7,752,659 B2 * | 7/2010 | Cromer et al. | 726/13 |
| 2002/0078227 A1 * | 6/2002 | Kronenberg | 709/237 |
| 2003/0081615 A1 * | 5/2003 | Kohn et al. | 370/395.42 |
| 2005/0005150 A1 * | 1/2005 | Ballard | 713/200 |
| 2006/0095969 A1 * | 5/2006 | Portolani et al. | 726/23 |
| 2007/0220600 A1 * | 9/2007 | de Graaf et al. | 726/22 |
| 2008/0127346 A1 * | 5/2008 | Oh et al. | 726/23 |
| 2010/0138919 A1 * | 6/2010 | Peng et al. | 726/22 |
| 2010/0269167 A1 * | 10/2010 | Kashima | 726/7 |
| 2014/0344430 A1 * | 11/2014 | Ayanam et al. | 709/223 |

* cited by examiner

*Primary Examiner* — David Le
(74) *Attorney, Agent, or Firm* — Davis Wright Tremaine LLP

(57) ABSTRACT

A system and method comprising a network interface controller having a processor configured to receive data packets, determine whether field values extracted from the packet satisfy legitimacy criteria, and based on the determination, either provide the packet to a computing device if a set of one or more legitimacy criteria is satisfied or perform a mitigation action if the set of one or more legitimacy criteria is not satisfied.

20 Claims, 9 Drawing Sheets

NETWORK INTERFACE WITH ON-BOARD PACKET PROCESSING

BACKGROUND

The Internet has been a boon to a great many businesses. Many of those businesses, such as computing resource service providers, are dependent on the ability of the Internet to provide fast and stable communications between network sites of the businesses and their users. However, numerous threats abound which may have significant adverse effects on the speed and stability of the network, such as distributed or other denial of service attacks wherein systems intentionally target a network server with a flood of incoming messages such that, in a best case, legitimate users of the server experience slow connections, and, in a worst case, the network server may become inoperable. However, conventional techniques, such as filtering all received network traffic through a central point that attempts to identify and filter out bad network traffic, can be resource-intensive and expensive for a business, and often require high capacity, dedicated equipment that takes up valuable space in a data center and often becomes a bottleneck for hosts and users.

BRIEF DESCRIPTION OF THE DRAWINGS

Various embodiments in accordance with the present disclosure will be described with reference to the drawings, in which.

DETAILED DESCRIPTION

Figure 1:
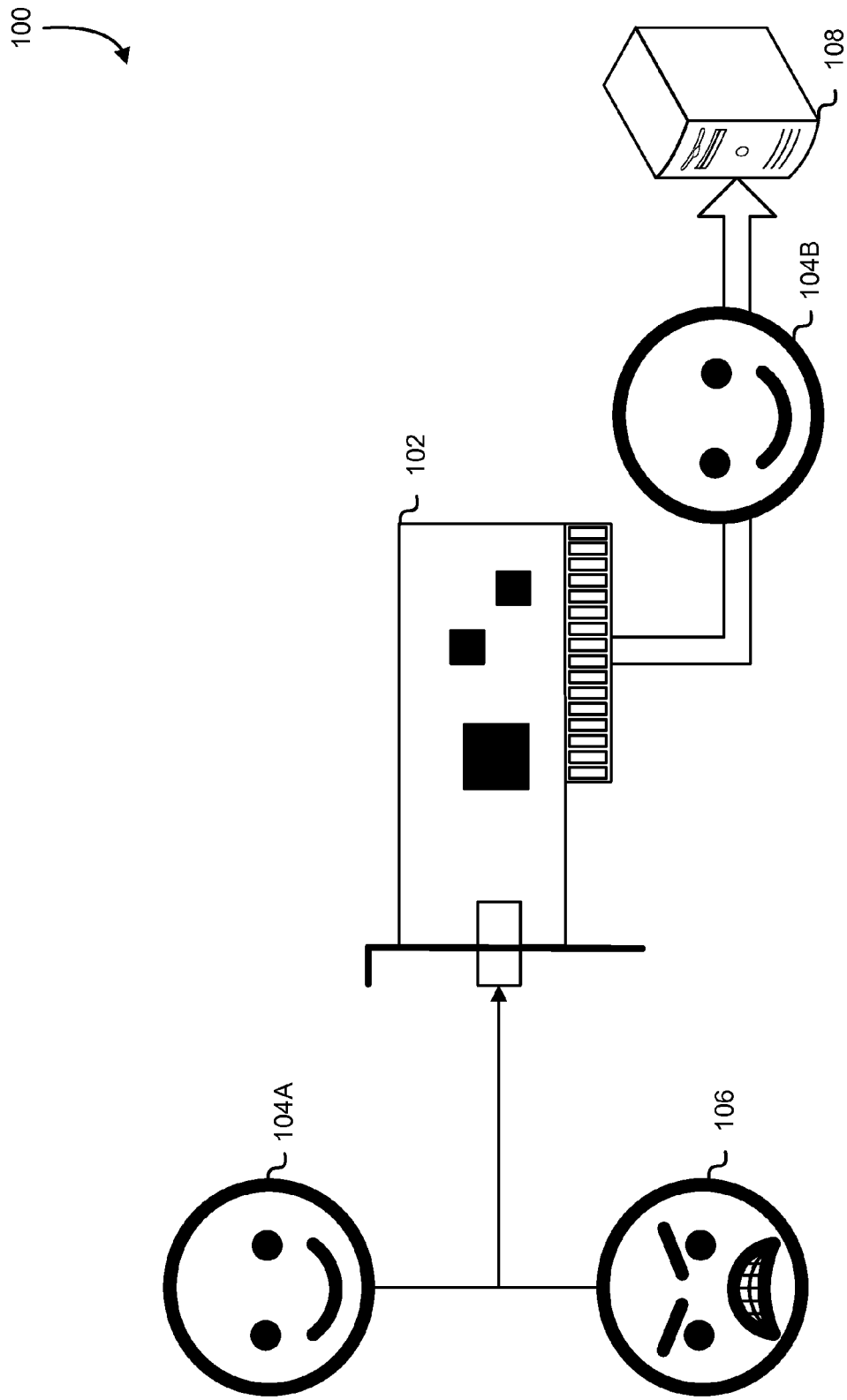
FIG. 1 illustrates an example of a network interface controller filtering packets in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include a method and system of denial of service attack mitigation by utilizing a network interface controller having one or more processors configured to filter out data packets corresponding to a denial of service attack (i.e., not trustworthy) and forwarding data packets corresponding to legitimate traffic to a device hosting the network interface controller. The method further includes out-of-band management of the network interface controller having one or more processors for denial of service mitigation.

Denial of service attacks mitigation may be performed by passing network traffic through an intermediary device that attempts to determine whether incoming network packets are coming from a legitimate source or a hostile source, like a botnet. The intermediary device may make this determination by examining the incoming network packets metadata, such as internet protocol (IP) addresses, cookies, and hypertext transfer protocol (HTTP) headers, and cross-referencing this metadata against rules and tables of information about known hostile sources. Packets that are determined not to be hostile are routed to the appropriate target device, while hostile packets are dropped. For example, packets transmitted by a hostile device with an internet protocol address known to belong to a denial of service attacker are checked and the hostile packets are discarded without reaching the target device and tying up its resources.

The present disclosure describes performing denial of service attack mitigation by a network interface controller of the target device. Performing denial of service attack mitigation with the network interface controller of the target device may avoid a potential bottleneck caused by routing all incoming network traffic through a central point for denial of service attack mitigation. For example, packets transmitted by a hostile device with an internet protocol address known to belong to a denial of service attacker will reach the network interface controller of the target device, whereupon the hostile packets are checked and the hostile packets may be discarded without tying up the resources of the target device.

To meet the demands required for checking network packets without significantly impacting legitimate network communications with the target device, the network interface controller of this disclosure has an on-board processor for performing denial of service mitigation. The on-board processor may be any suitable processing device, such as one or more of a microprocessor, a co-processor, a micro-controller, a microcomputer, a central processing unit, a graphics processing unit, application specific integrated circuit (ASIC), custom reduced instruction set computing (RISC) chip or some other programmable logic device. Examples of such processing devices include, but are not limited to, devices based on an Intel x86 architecture, an Itanium architecture, an reduced instruction set (RISC) architecture (including ARM, Power Architecture and Blackfin architectures), and a SPARC architecture.

The network interface controller of this disclosure may utilize an on-board processor to inspect packets received, checking the metadata within the packet for criteria indicating that the packet originates from a denial of service attacker. Packets that are indicated as originating from a denial of service attack may be dropped, while other packets may be passed from the network interface controller to the target device. For example, the network interface controller may have access to internet protocol tables and firewall rules, for example in on-board random access memory (RAM), read-only memory (ROM), or firmware, and the on-board processor may inspect incoming packets to determine whether the packet originates from any of the addresses in the internet protocol tables. A technical advantage achieved by filtering packets by the individual network interface controllers of the target device is that it reduces the physical footprint of denial of service mitigation; e.g., by performing the denial of service mitigation at the target server location, valuable space within a data center that would have been used for servers or other devices dedicated to packet filtering may be used for other purposes.

The on-board processor of the network interface controller may be configured to filter packets and apply firewall rules one or more ways. One way among others may be that the network interface controller is pre-set with logic for performing the packet filtering and application of firewall rules by the manufacturer. Another way among others may be that the on-board processor may execute instructions stored in one of the memories described above, with the executable instructions directing the processor on how to filter the packets and apply the firewall rules. A third way may be to utilize a combination of the previous two ways. Further, in some embodiments, the filtering and firewall rules, and even the executable instructions directing the on-board processor may be updated/modified using out-of-band management.

As noted, the internet protocol tables and firewall rules may be maintained with out-of-band management. Out-of-band management refers to being able to control a device through a dedicated channel such that the device may be managed when normal modes of communicating to the device are unresponsive, such as when the device is in a sleep mode, error state, or unresponsive due to a distributed denial of service attack. Out-of-band management allows system administrators to connect to and update the settings of devices remotely, without software being installed on the system being managed. One advantage of out-of-band management of the network interface controller is that the network interface controller may be updated even if the operating system of the target device in which the network interface controller is installed is non-responsive due to a distributed denial of service attack. Thus, the internet protocol tables, firewall rules, and even the basic input/output system (BIOS) of the network interface controller may be updated to provide the most up-to-date mitigation information about potential distributed denial of service attackers.

FIG. 1 illustrates an aspect of an environment 100 in which an embodiment of the present disclosure may be practiced. As illustrated in FIG. 1, the environment 100 may include a network interface controller 102 filtering legitimate packets 104A and undesirable packets 106, passing the legitimate packets 104B on to a server 108. Note that the term legitimate packets, in the context used herein, refers to packets that the network interface controller of the present disclosure passes along to the destination device; i.e., the packets are legitimately passed to the destination device. Likewise, the undesirable packets 106, in some embodiments, may not necessarily be hostile, but may be packets that the network interface controller of the present disclosure drops, flags, tracks or performs some other action rather than or in addition to passing the packet to the destination device, because, as noted herein, the present disclosure may be configured to perform operations other than denial of service attack mitigation. Note also that a host computing device, such as the server 108, may host more than one network interface controller 102, with each network interface controller 102 performing operations independently of the other.

Figure 3:
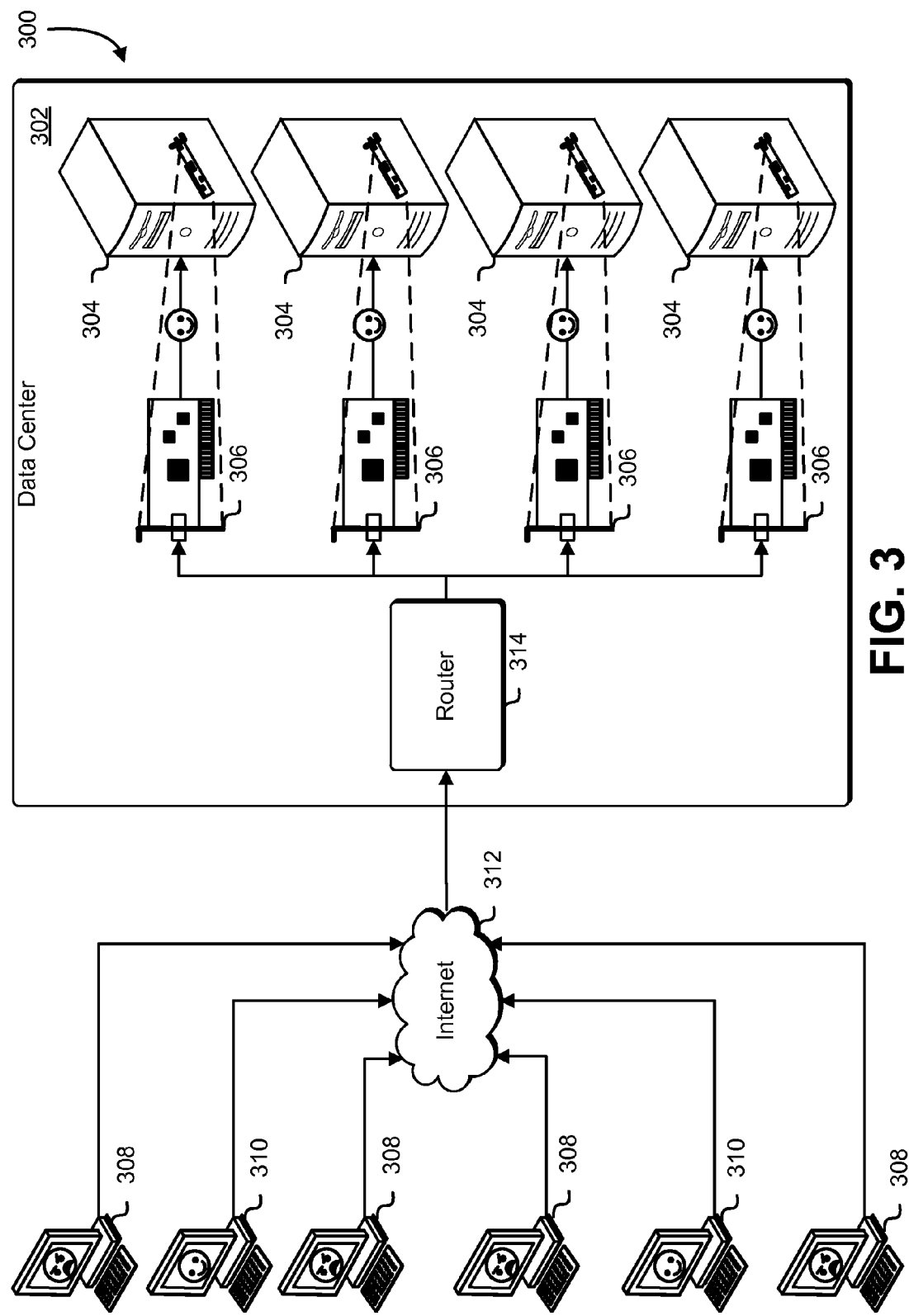
FIG. 3 illustrates an example of network interface controllers, in accordance with at least one embodiment, protecting servers from a distributed denial of service attack without disrupting communication with legitimate users in accordance with at least one embodiment.

The network interface controller 102 in the environment 100 would be a network interface controller such as network interface controller 202 as described in FIG. 3. Note that the network interface controller 102 of this disclosure need not be an Ethernet network interface card of the form illustrated in the environment. Examples of a network interface controller 102 of this disclosure include, but are not limited to, Ethernet, Wi-Fi, and token ring configurations in peripheral component interconnect (PCI), PCI Express, ExpressCard forms as well as being integrated with other circuitry of the target device, such as on the motherboard of the server 108, using one or more integrated chips (ICs).

The legitimate packets 104A may be packets requested by actual human users, such as comprising a request for a website, an HTTP GET or POST response, a file download, a file transfer protocol command, or other communication with the server 108. The legitimate packets 104A may further originate from an application or service designed to interact with the server 108, such as time synchronization packets transmitted from an NTP server or a response from a domain name system (DNS) server. The undesirable packets 106 may be packets from one or more machines running botnets, or otherwise making a denial of service attack against the server 108. For example, the undesirable packet may be part of a synchronization flood (SYN flood), user datagram protocol flood (UDP flood), network time protocol (NTP) reflection, or simple network management protocol (SNMP) reflection attacks attack against the server 108.

Note, however, that the on-board processor may be used for purposes beyond or instead of denial of service attack mitigation. For example, the network interface card may be used to enforce blacklists (also known as block lists) to block data originating from addresses in the list, may be used to perform whitelisting whereby only data originating from specified addresses are allowed through e-mail spam filtration and content blocking for preventing the device hosting the network interface card from accessing to restricted sites. The on-board processor may also be used to encrypt/decrypt outgoing and incoming data, such as for secure sockets layer (SSL) offloading The network interface controller 102 examines the metadata of each packet, in some examples, checking the internet protocol information of the packet against an internet protocol table of known attackers and otherwise applying firewall rules to the metadata of the packets. The result of this packet filtering is that legitimate packets 104B are allowed to be received by the server 108 while the undesirable packet is ignored (i.e., dropped). The server 108 of the environment may be any suitable electronic device alone or present within a distributed, virtual or clustered environment, such as a data server, a web server, a portable computing device, a personal computer, or an electronic computing device similar to electronic computing device 902 described in FIG. 9.

The network interface controller of the present disclosure may have one or more on-board processors for performing detection and mitigation of denial of service attacks. As noted, the on-board processor may be any suitable processing device, such as one or more of a microprocessor, a co-processor, a micro-controller, a microcomputer, a central processing unit, a graphics processing unit, or a programmable logic device. Examples of such processing devices include, but are not limited to, devices based on an Intel x86 architecture, an Itanium architecture, an reduced instruction set (RISC) architecture (including ARM, Power Architecture and Blackfin architectures), and a SPARC architecture.

The network interface controller may further have a storage component for storing internet protocol tables, firewall rules, and executable software code usable for performing denial of service detection and mitigation. In some cases, some or all of the information within the internet protocol tables, firewall rules, and other data used for filtering may be stored in Bloom filters for more efficient processing. The storage component may be a single memory device or a plurality of memory devices comprising one or more of read-only memory, random access memory, non-volatile memory, static memory, dynamic memory, flash memory, cache memory, and/or any device that stores digital information. In some embodiments, the network interface controller may also monitor network latency of incoming packets and route incoming data packets to alternate computing devices having less latency on the network than the target computing device. For example, if the target computing device is being negatively impacted by a denial of service attack, the network interface card may be able to reduce the load on the target computing device by forwarding packets to share the load with other computing devices. In other embodiments, the network interface controller may be managed using an out-of-band management channel.

Figure 2:
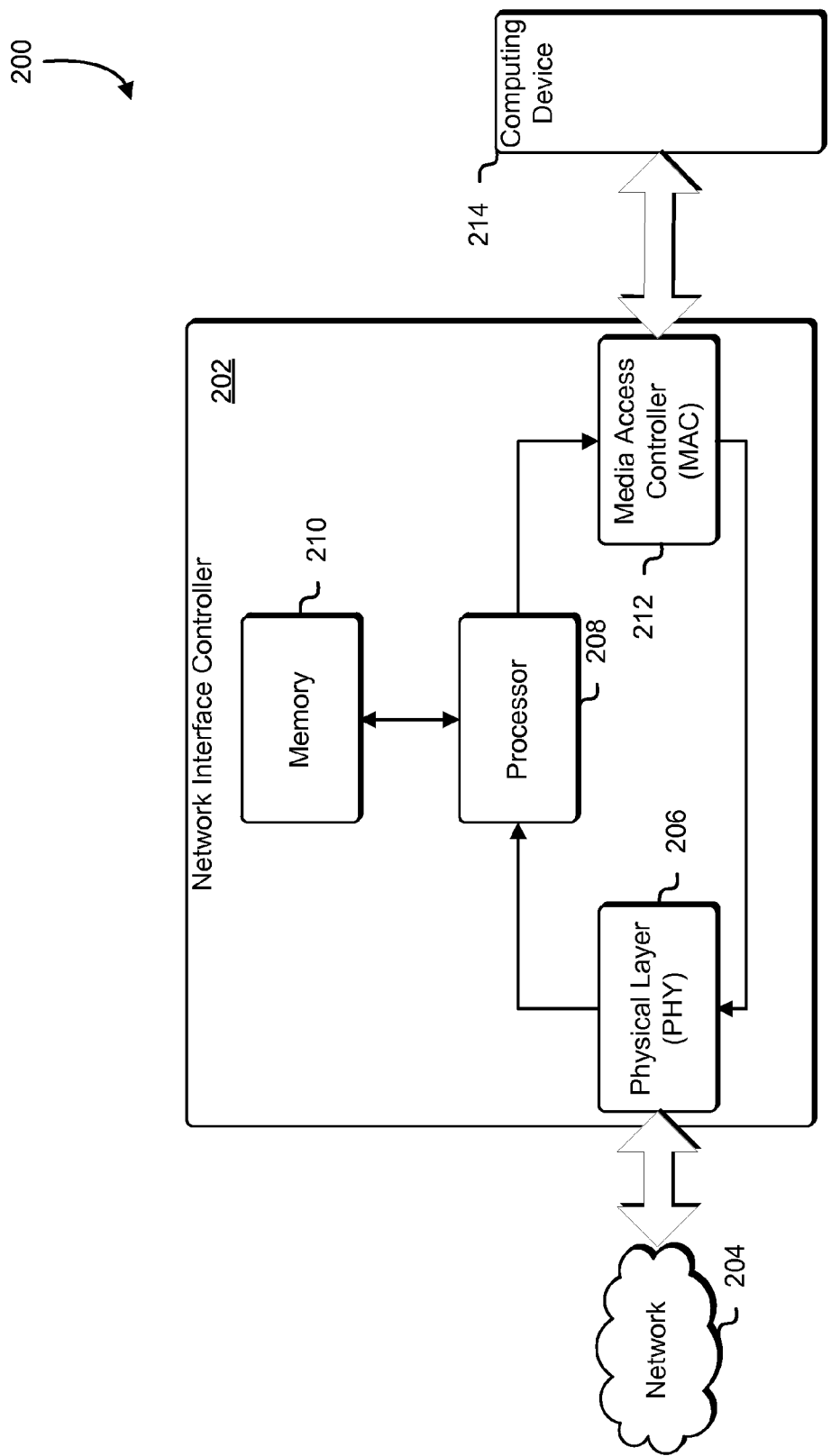
FIG. 2 is a block diagram illustrating an example of a network interface controller in accordance with at least one embodiment.

FIG. 2 illustrates an aspect of an environment 200 in which various embodiments of the present disclosure may be practiced. Specifically, FIG. 2 depicts an example network interface controller 202 of the present disclosure operating within the environment 200. The network interface controller 202 in this example may be connected to a network 204, such as an Ethernet network by way of an RJ-45 cable, or the network interface controller 202 may be wirelessly connected to the network 204, such as through Wi-Fi. Ultimately, such a network 204 may connect to the Internet.

The first three layers of the Open Systems Interconnection (OSI) model for network architecture are the physical layer, the data link layer, and the network layer. The physical layer consists of the hardware transmission technologies of the network. The data link layer is the layer that provides for encapsulating data packets into frames, synchronizing frames, and error correction. The data link layer is comprised of the logical link control sublayer and the media access control sublayer. The logical link control (LLC) sublayer allows different network protocols to coexist on the same network and may provide flow control and error management mechanisms. The media access control (MAC) sublayer provides addressing and access control, making it possible for nodes of a network to communicate with each other. The network layer provides for packet routing and forwarding. The network interface controller of the present disclosure may operate at the data link layer as it performs checksum and header validation, and may operate at the network layer as it validates source and destination internet protocol addresses and/or forwards data packets to destination devices, and, in some embodiments, performs virus checking and other content validation on the payloads or groups of payloads of data packets.

The network interface controller 202 may have a physical layer 206, consisting of the basic hardware transmission components for computer networking. The physical layer 206 supplies encoding/decoding functionality and timing functions for interfacing with the network through network media, such as RJ-45 cable or optical cable.

The network interface controller 202 of the present disclosure may further contain a processor 208 having access to a local memory 210. As noted, the processor 208 may be any suitable processing device, such as one or more of a microprocessor, a co-processor, a micro-controller, a microcomputer, a central processing unit, a graphics processing unit, or a programmable logic device. Examples of such processing devices include devices based on various architectures, including, but not limited to, an Intel x86 architecture, an Itanium architecture, a reduced instruction set (RISC) architecture, a Power Architecture and a SPARC architecture.

Examples of the memory 210 include, but are not limited to, a single memory device or a plurality of memory devices comprising one or more of read-only memory, random access memory, volatile memory, non-volatile memory, static memory, dynamic memory, flash memory, cache memory, and/or any device that stores digital information. The processor 208 of the network interface controller 202 may receive incoming packets from the physical layer 206 and, with reference to information, such as internet protocol tables and firewall rules, within the memory, may determine which packets are legitimate traffic and which packets originate as a result of a denial of service attack and should be dropped. Upon making this determination, the processor 208 may forward the legitimate packets to the media access controller 212.

The media access controller 212 performs functions related to the transmission and reception of data packets. For example, when preparing to provide the data to the physical layer 206, the media access controller 212 assembles the data into packets with addresses and error detection fields. Likewise, when receiving data packets for transfer to a computing device 214, the media access controller 212 disassembles the packet and performs address checking and error detection. Thus, legitimate packets, like legitimate packets 104A and 104B described in reference to FIG. 1, received by the media access controller 212 from the processor 208 are processed and output to the computing device 214. Depending on the embodiment, the legitimate packets may be output to the computing device 214 through various channels, including, but not limited to a PCI bus (for example, if the network interface controller is embodied as a card present in a PCI slot of the computing device), through a network connection (for example, if the network interface controller of the present disclosure is embodied in a network router), or some other bus present on a motherboard of the computing device 214 (for example if the network interface controller of the present disclosure is embodied within one or more integrated circuits present on a motherboard of the computing device 214).

Going the other direction, the media access controller 212 receives data from the computing device 214, processes the data, and forwards the processed data directly to the physical layer 206 for output to the network media, bypassing the processor 208. In some embodiments, such as that depicted in FIG. 2, the processor 208 may be bypassed for this data because the server may be trusted and only legitimate traffic should be travelling in this direction. However, in other embodiments, outbound traffic may be directed through the processor 208 for various purposes, such as for logging NTP server requests or for analyzing outgoing data for breaches of data security (i.e., for data loss prevention (DLP) blocking purposes). In this embodiment, by logging NTP server requests, unsolicited responses from NTP servers, such as from an NTP attack, may be filtered out without significantly burdening the computing device 214. In some embodiments, the processor 208 and/or memory 210 may be integrated with the media access controller 212. In other embodiments, the processor 208 and/or memory 210 may be located between the media access controller 212 and the computing device 214, and packets received by the physical layer 206 pass through the media access controller 212 before being processed by the processor 208. In still other embodiments, one or more of the physical layer 206, processor 208, memory 210, and media access controller 212 may be connected to a common bus.

FIG. 3 illustrates an aspect of an environment 300 in which an embodiment of the present disclosure may be practiced. As illustrated in FIG. 3, the environment 300 may include a data center 302 hosting a plurality of servers 304 having a network interface controller 306 of the present disclosure, wherein attackers 308 and legitimate users 310 connected to the Internet 312 send packets to the servers 304, which are routed to each network interface controller 306 by a router 314. The data center 302 may be a data center of a computing resource service provider hosting a plurality of servers 304 of various types as depicted in the environment 500 of FIG. 5.

The plurality of servers 304, in various embodiments, may be configured to host a network interface controller 306 similar to the network interface controller 202 described in FIG. 2. Note that more than one network interface controller 306 may be present within any of the plurality of the servers 304. Examples of such servers 304 include data servers and other servers including, but not limited to web server 906 and application server 908 described in FIG. 9. As noted, the network interface controller 306 may be similar to the network interface controller 202 described in FIG. 2, having an on-board processor 208, an examples of which includes, but is not limited to, a microprocessor, a co-processor, a microcontroller, a microcomputer, a central processing unit, a graphics processing unit, or a programmable logic device.

Websites and computing resource service providers are frequently targets of denial of service attacks, which are external attempts to overload the resources of one or more target devices, such as servers 304, such that, the target device responds slowly to communication requests from legitimate users, for example, web sites served by the target device become unavailable or slow to load, or, in some cases, the target device may stop working altogether. A distributed denial of service attack is an attack wherein denial of service attacks are made against the target device by multiple systems, often infected by malicious software (malware) executing on computer systems of unsuspecting users. Malware configured to make coordinated actions against one or more targeted devices is known as a botnet. Because the distributed denial of service attacks can come from numerous sources, mitigating distributed denial of service attacks can be difficult and may demand additional resources from website administrators and computing resource providers.

Distributed denial of service attacks are often made by "flooding" the target device with communication requests. Common types of floods used in distributed denial of service attacks are synchronization flood (SYN flood), user datagram protocol flood (UDP flood), network time protocol (NTP) reflection, and simple network management protocol (SNMP) reflection attacks. A SYN flood is an attack where the attacking machines, depicted in FIG. 3 by attackers 308, transmit a succession of synchronization (SYN) requests to the target device. The target device, interpreting the requests as legitimate, responds with a synchronization acknowledge (SYN-ACK) message. However, the attacking machines do not respond to the SYN-ACK message, causing the target device to wait for some period of time while expecting a response. A multitude of repeated SYN requests can thereby tie up resources of the target device to the point that legitimate connection requests cannot be made.

A UDP flood occurs when attacking machines, illustrated by the attackers 308, transmit many UDP packets to random ports of the target device. In response, the target device checks to see whether any application is expecting to receive the UDP packets at the receiving port, and responds with an internet control message protocol (ICMP) destination unreachable message. A multitude of repeated UDP attacks can thereby tie up resources of the target device by causing it to provide multitudes of ICMP return packets.

An NTP reflection attack involves transmitting communication requests using a forged (spoofed) internet protocol address of the target device to NTP servers, which are servers used by computers and other devices for clock synchronization and are often publicly available. The NTP server may respond to the communication requests, sent to it by attackers 308 spoofing the destination address of the target device, such as one or more of servers 304, by sending a relatively large amount of data to the target device. For example, every time an NTP attacker 308 provides a "monlist" (or MON_GETLIST) command to an NTP server, the NTP server may respond by transmitting addresses of up to the last 600 machines the NTP server has interacted with to the spoofed address of the target device, thereby consuming the bandwidth of the target device. In this manner, a multitude of NTP attacks may quickly consume large amounts of the target device's bandwidth.

An SNMP reflection attack often involves netbots that send small SNMP queries to gateway devices using a source internet protocol address spoofed to be an internet protocol address of a target device. The gateway devices respond by sending SNMP responses to the internet protocol address of the target device. The SNMP response data may be much larger than the query data sent by the netbots and the bandwidth of the target device may be inundated and overwhelmed by the SNMP data received.

The attackers 308 depicted may be botnets attacking one or more of the servers 304 with a distributed denial of service attack, such as a SYN flood, UDP flood, or NTP reflection attack, whereas the legitimate users 310 may be customers of the computer resource service provider attempting to access the servers 304 for any of a variety of purposes, such as online shopping, video or audio streaming, news feeds, utilizing a search engine, file downloading, or browsing. Note that the router 314 is depicted for illustrative purposes, and the network interface controller 306 may be used in any suitable computing environment with or without one or more routers 314, such as a direct connect environment, or utilizing one or more network switches instead of or in addition to router 314 or other method of enabling data packets to reach their target device, such as the servers 304. The router 314 in FIG. 2 is depicted to be connected to the Internet 312, but the network interface controller 306 of the present disclosure may be utilized with any suitable network, such as a public or private network like a local area network, a wide area network, wireless network, distributed network or the Internet 312.

Figure 4:
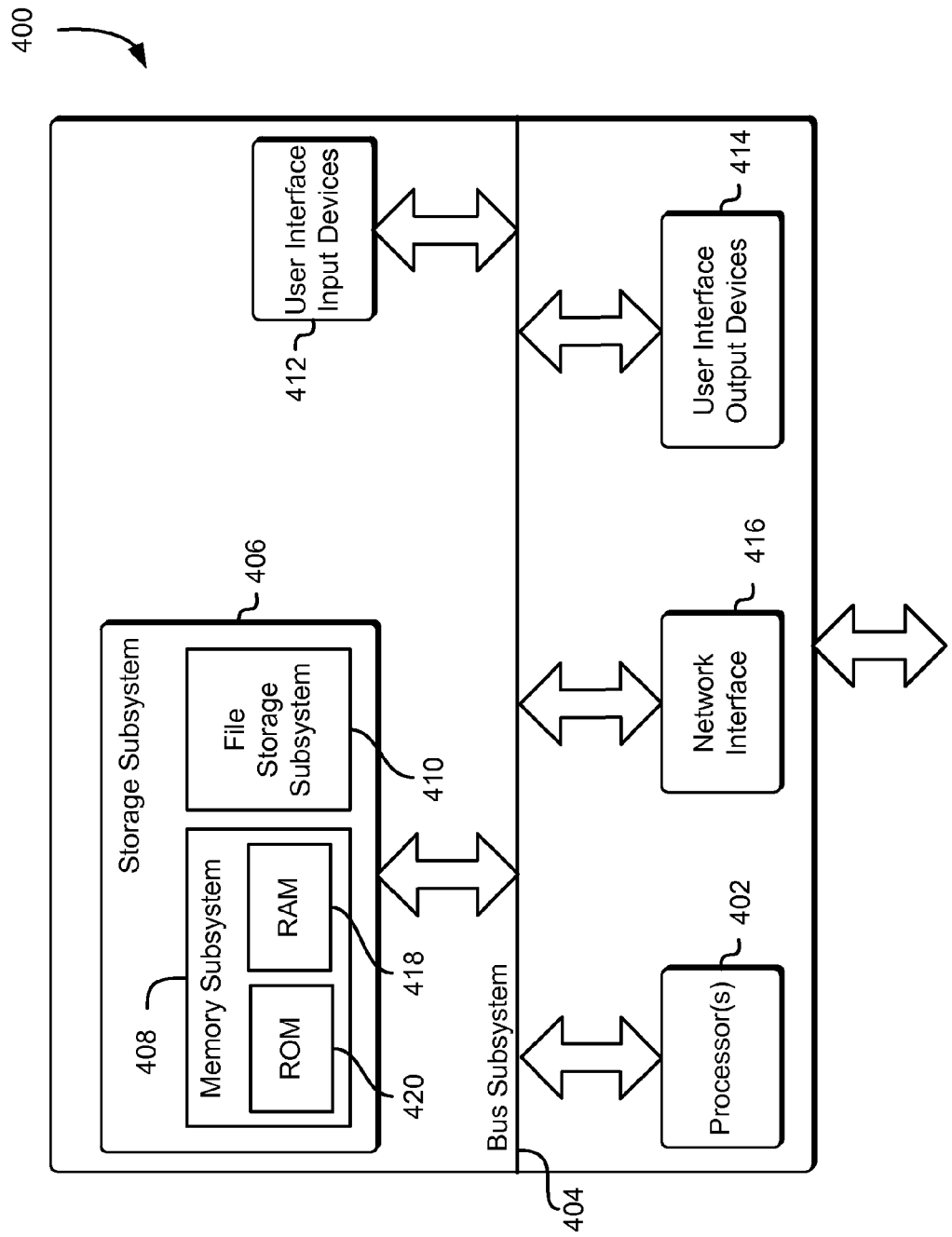
FIG. 4 illustrates a computing device that may be used in accordance with at least one embodiment.

FIG. 4 is an illustrative, simplified block diagram of an example computing device 400 that may be used to practice at least one embodiment of the present disclosure. In various embodiments, the computing device 400 may be used to implement any of the systems illustrated herein and described above. For example, the computing device 400 may be configured for use as a data server, a web server, a portable computing device, a personal computer, or any electronic computing device similar to an electronic computing device 902 described in FIG. 9. As shown in FIG. 4, the computing device 400 may include one or more processors 402 that may be configured to communicate with, and are operatively coupled to, a number of peripheral subsystems via a bus subsystem 404. These peripheral subsystems may include a storage subsystem 406, comprising a memory subsystem 408 and a file storage subsystem 410, one or more user interface input devices 412, one or more user interface output devices 414, and at least one network interface controller 416.

The bus subsystem 404 may provide a mechanism for enabling the various components and subsystems of computing device 400 to communicate with each other as intended.

Although the bus subsystem 404 is shown schematically as a single bus, alternative embodiments of the bus subsystem may utilize multiple busses.

The network interface controller 416 may be a network interface controller having an on-board processor, similar to the network interface card 202 of FIG. 2, and may provide an interface to other computing devices and networks. The network interface controller 416 may serve as an interface for receiving data from, and transmitting data to, other systems from the computing device 400. For example, the network interface controller 416 may enable a data technician to connect the device to a wireless network such that the data technician may be able to transmit and receive data while in a remote location, such as a customer data center. The network interface controller 416 may comprise more than one network interface controller 416 performing operations independently from each other. The network interface controller 416 may be utilized with any suitable network, such as a public or private network like a local area network, a wide area network, wireless network or the Internet. The network interface controller 416 performs denial of service mitigation of hostile network traffic targeting the computing device 400 by, for example, performing packet filtering of incoming network data packets against internet protocol tables and firewall rules.

The user interface input devices 412 may include one or more user input devices, such as a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the computing device 400.

User interface output devices 414 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 400. The output device(s) 414 may be used, for example, to present user interfaces to facilitate user interaction with applications performing processes described herein and variations therein, when such interaction may be appropriate.

The storage subsystem 406 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, and may be stored in the storage subsystem 406. These application modules or instructions may be executed by the one or more processors 402. The storage subsystem 406 may additionally provide a repository for storing data used in accordance with the present disclosure. The storage subsystem 406 may comprise a memory subsystem 408 and a file/disk storage subsystem 410.

The memory subsystem 408 may include a number of memories including a main random access memory (RAM) 418 for storage of instructions and data during program execution and a read only memory (ROM) 420 in which fixed instructions may be stored. The file storage subsystem 410 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The computing device 400 may include at least one local clock 424. The local clock 424 may be a counter that represents the number of ticks that have transpired from a particular starting date and may be located integrally within the computing device 400. The local clock 424 may be used to synchronize data transfers in the processors for the computing device 400 and all of the subsystems included therein at specific clock pulses and may be used to coordinate synchronous operations between the computing device 400 and other systems in a data center. In one embodiment the local clock 424 is an atomic clock. In another embodiment, the local clock is a programmable interval timer.

The computing device 400 may be of various types including a portable computer device, tablet computer, a workstation, or any other device described below. Additionally, the computing device 400 may include another device that may be connected to the computing device 400 through one or more ports (e.g., USB, a headphone jack, Lightning connector, etc.). The device that may be connected to the computing device 400 may include a plurality of ports configured to accept fiber-optic connectors. Accordingly, this device may be configured to convert optical signals to electrical signals that may be transmitted through the port connecting the device to the computing device 400 for processing. Due to the ever-changing nature of computers and networks, the description of the computing device 400 depicted in FIG. 4 is intended only as a specific example for purposes of illustrating the preferred embodiment of the device. Many other configurations having more or fewer components than the system depicted in FIG. 4 are possible.

Figure 5:
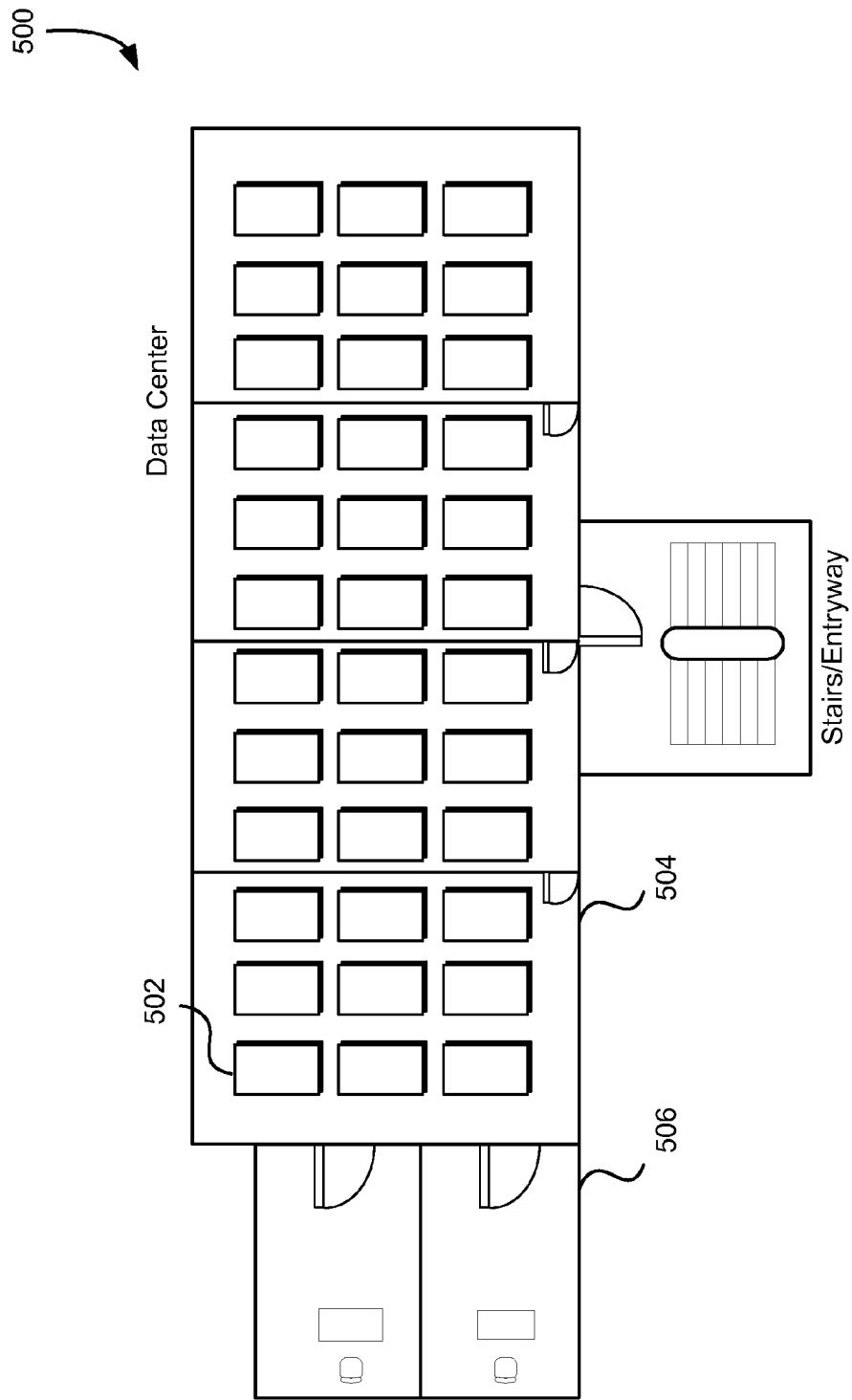
FIG. 5 illustrates a data center wherein network interface controllers, in accordance with at least one embodiment, may be usable.

FIG. 5 illustrates an aspect of an environment 500 in which various embodiments of the present disclosure may be practiced. As illustrated in FIG. 5, within the environment 500, one or more data servers 502 may be arranged in various configurations within a data center 504. The data center 504 may be maintained by one or more of the computing resource service provider employees. Thus, the data center 504 may have additional offices 506 in order to support various employee tasks. In at least one embodiment, at least one of the data servers 502 located within the data center 504 may contain a network interface controller similar to the network interface controller 202 described in FIG. 2.

However, the network interface controllers of the present disclosure need not be constrained to a data center, client-server, or multi-server environment. The network interface controller of the present disclosure may be usable by a personal computing device, such as a personal computer, laptop, smartphone, tablet device, or other electronic client device similar to electronic client device 902 described in conjunction with FIG. 9, for additional protection against the device by hostile attackers.

In some embodiments, the network interface controller performs synchronous actions regarding the data packets it receives. That is, as packets are received, those packets are processed and, if determined to be legitimate and not part of a denial of service attack the packets are passed through to the host computing device. Alternately, in other embodiments, the network interface controller may be configured to act as a router and forward (re-route) the legitimate packets to the appropriate destination device. Otherwise, if the packets are deemed hostile (e.g., part of a denial of service attack), the packets may be dropped or rejected (i.e., an error message transmitted to the sender).

In other embodiments, the network interface controller performs asynchronous actions regarding the data packets it receives. That is, data obtained by analyzing a data packet may be used to effect an action on another data packet. For example, in some embodiments, the network interface controller may log network statistics, such as roundtrip times of sent and received packets and retransmits at the hardware level, and, using these logged statistics, may be able to determine network latencies and other statistics. These network latencies and other statistics may be useful in embodiments where the network interface controller may forward future received packets to appropriate servers on the network with less latency. For instance, a network interface controller may log the time of an outgoing response to a request and again log the time when a data packet is received notifying the network interface controller that the outgoing was delivered or undeliverable. Network latencies and other statistics may be used to perform network load balancing or denial of service mitigation, for example, if the target computing device is being negatively impacted by a denial of service attack, the network interface card may be able to reduce the load on the target computing device by forwarding packets to share the load with other computing devices. In some embodiments, the log may be provided to a user, application, service, device or other entity by reporting the log to an endpoint, such as a server or other device. In other embodiments, the network interface controller may report its log to a user, application, service, device or other entity in response to a programmatic call to an application programming interface. In such embodiments as described herein, the network interface controller of the present disclosure may be usable by a router, switch, or other computing device acting to route data packets to and from one network to another or to and from the Internet, such as a Linux-based system configured as a router. In still other embodiments wherein the network interface controller performs asynchronous actions, the network interface controller may log the source internet protocol addresses of received packets. In such embodiments, the logged addresses may be used to identify denial of service attacks not initially flagged by the internet protocol tables and filtering rules. For example, data packets may be received from a particular internet protocol address that, when internet protocol tables and filtering rules are applied, initially appear to be legitimate network traffic. However, if the network interface controller begins to detect (e.g., by referencing the logs of addresses to determine whether a certain source internet protocol address has been logged more than a threshold number of times within a given time period) that the device at the source internet protocol address is consuming an alarming amount of the bandwidth of the target computing device or sending an unusually large number of packets to the target computing device, the network interface controller may determine that the data packets may be a portion of a denial of service attack and perform a suitable mitigation action.

In still other embodiments, the on-board processor of the network interface controller may be able to scan the payloads of data packets for viruses, trojans, malware, or other data to be flagged according to defined legitimacy criteria. However, because data packets may be fragmented (i.e., each data packet comprising only a portion of the data being sent), in such an embodiment, the network interface controller may temporarily store such packets until all fragments of the data are collected, assembled, and the assembled payloads may be scanned for viruses, trojans, malware, or other content. In some embodiments, the on-board processor of the network interface controller may be configured to analyze and/or filter outgoing data, such as for mitigation of data breaches by performing data loss prevention (DLP) analysis and blocking on data outgoing from the host computing device.

The network interface controller of the present disclosure may serve as a standard network interface controller or may additionally act as a firewall by performing packet filtering with its on-board processor. For example, as incoming data packets are received, the processor of the network interface controller may verify the checksum of the packet and confirm the validity of the packet header. The processor may further check the source internet protocol address of the packet against a table containing invalid internet protocol addresses and source net blocks (i.e., groups of sequential internet protocol addresses), internet protocol addresses of known attackers, and other internet protocol addresses that may be blocked. The processor may also determine whether the packet came from a hostile domain (i.e., domains known for hosting denial of service attackers or netbots) or an invalid domain.

Multiple network interface controllers of the present disclosure may be present within a single computing device, with each network interface controller independently performing packet filtering on data packets received through their respective connections to a network. In some embodiments, one or more network interface controllers may perform packet filtering on the same data packets in series or in parallel. For example, one network interface controller may validate checksums on a data packet while another network interface controller validates the source internet protocol address of the data packed against internet protocol tables.

Figure 6:
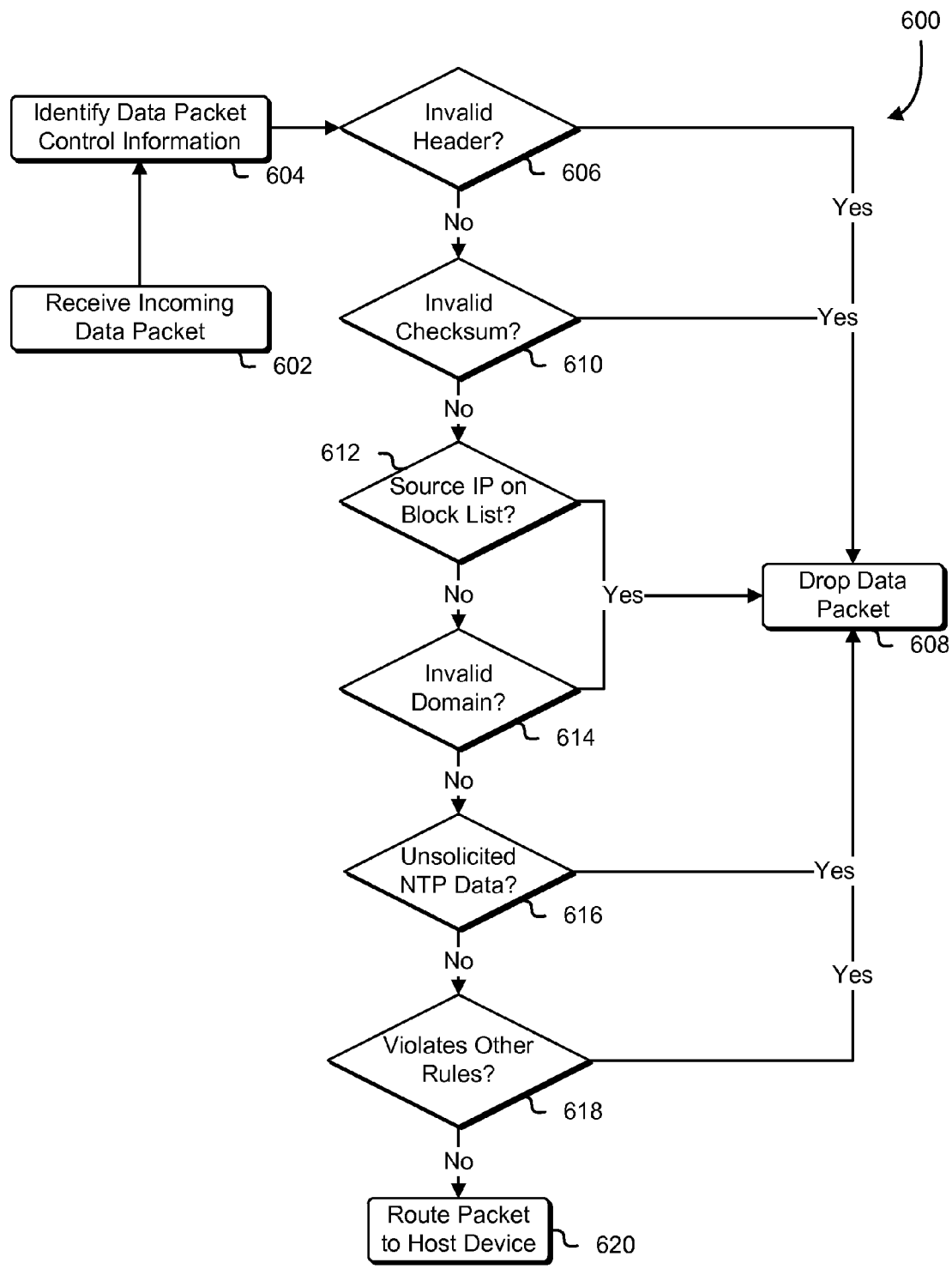
FIG. 6 is a flow chart that illustrates an example of network packet filtering by a network interface controller in accordance with at least one embodiment.

FIG. 6 is a flow chart illustrating an example of a process 600 for packet filtering by a network interface controller with an on-board processor in accordance with various embodiments. The process 600 may be performed by any network interface controller of the present disclosure, such as the network interface controller 202 with an on-board processor 208 described in FIG. 2, hosted by any suitable system such as a data server, web server, personal computing device, router, switch, or any electronic client device such as the computing device 400 described in conjunction with FIG. 4 and the electronic client device 902 described in conjunction with FIG. 9. The process 600 includes a series of operations wherein data packets are received and checked against various legitimacy criteria (i.e., filtering and firewall rules) and, depending on the outcome of the checks, the packets are dealt with accordingly. Note that different variations the process 600 are possible that use various combinations of operations alternative to or in addition to the operations depicted in FIG. 6. Furthermore, as noted, such operations may be performed in any order, including in parallel, and the individual operations may be combined into fewer operations or separated into additional operations or sub-operations.

In 602, a data packet is received by the network interface controller through a network connection. The data packet may be data formatted to be provided by a network and is typically divided into control information and payload (i.e., user data). The control data of the data packet is typically located within the header or trailer portion of the data packet and may contain various information fields indicating the type of packet, header or trailer length, priority of the packet (also known as quality of service (QoS)), length of the packet, identification tag, fragmentation flags, expiration or time to live (TTL) data, protocol type, checksums for error detection, and the source and destination network addresses, and other data depending on the protocol used. Examples of different types of data packets that the network interface controller may be filtering include, but are not limited to, Internet Protocol version 4 (IPv4) packets, Internet Protocol version 6

(IPv6) packets, and Ethernet II frame packets. The control data of a data packet may be classified into data integrity fields and semantic fields. The data integrity fields include information usable to determine the condition (i.e., integrity) of the packet, such as the checksums for error detection and the time to live data of the packet. The semantic fields correspond to characteristics/attributes of the packet, and often contain information about the contents of the packet, such as the length of the packet and the priority of the packet. Examples of the network connections the data packet may be received upon include, but are not limited to, a local area network, a wide-area network, a virtual private network, the Internet, an intranet, an extranet, a public switched telephone network, an infrared network, a wireless network, a satellite network and any combination thereof.

In 604, the control information of the data packet is isolated, and in 606, the on-board processor of the network interface controller performs a check to determine whether the header is valid for the protocol expected. If the header validation fails, the processor performing the process 600 proceeds to 608, wherein appropriate action is performed according to the embodiment and the type of verification failure. As illustrated in 608, the data packet may be dropped (i.e., ignored and not passed on), however other operations may be additionally or alternatively taken at 608, such as rejecting the packet (i.e., ignoring the packet and providing an error message to the source internet protocol address), rate limiting the source internet protocol address, tarpitting (i.e., delaying future incoming packets from the source internet protocol address) the source internet protocol address. Furthermore, the network interface controller may log information including, but not limited to, logging the source internet protocol of the data packet and/or logging network statistics (e.g., roundtrip times, retransmits, etc.) corresponding to the data packet, in internal memory of the network interface controller, such as the memory 210 described in conjunction with FIG. 2. In other embodiments, some operations that may be taken in 608 may be to add the source internet protocol address or domain address to an internet protocol table as an address to be blocked or monitored, and further may communicate the offending source internet protocol address or domain address to other network interface controllers with processors on the network or data center, possibly through an out-of-band management channel, so that the other network interface controllers with processors may add the source internet protocol address or domain address to their internet protocol tables as an address to be blocked or monitored. In another embodiment usable in combination with other embodiments, the source internet protocol address may be routed to another device for forensic analysis.

However, if the header is valid, the processor performing the process 600 proceeds to 610, wherein the on-board processor performs a check to determine whether the checksum is valid for the data packet, header of the data packet, trailer of the data packet, or payload, as appropriate for the particular packet type or protocol involved. If the checksum validation fails, the processor performing the process 600 may proceed to 608, wherein appropriate action, as described above, is performed.

Likewise, if the checksum is valid, the processor performing the process 600 proceeds to 612, wherein the source internet protocol address is checked against internet protocol tables stored in memory of the network interface controller, such as the memory 210 described in conjunction with FIG. 2. If the source internet protocol address is found in the internet protocol tables as an internet protocol address to be blocked or watched, the processor performing the process 600 may proceed to 608, wherein appropriate action, as described above, is performed.

Otherwise, if the source internet protocol address is verified in 612, the processor performing the process 600 proceeds to 614, wherein the destination domain is referenced against domain names stored in memory of the network interface controller. In this step, if a domain is known to be under a distributed denial of service attack, incoming packets targeting that domain may be identified, possibly by performing a regular expression (regex) to match the destination domain of the packet with domain names known to be under a distributed denial of service attack. Further checking of source internet protocol addresses, source net blocks, source ports, destination internet protocol addresses, or destination ports may be used to separate legitimate traffic to the domain from hostile traffic. As illustrated, if the domain check of 614 fails, the processor performing the process 600 may proceed to 608, wherein appropriate action, as described above, is performed.

However, in 616, if the filtering passes the domain check in 614, the processor performing the process 600 proceeds to 616, wherein the processor may check to determine whether an NTP attack may be occurring. During this operation, if a data packet is recognized as being provided from an NTP server, the processor may consult logging information in memory of the network interface controller, such as the memory 210 described in conjunction with FIG. 2, to determine whether device hosting the network interface controller solicited the NTP server for the data packet. If the data packet does not correspond to an NTP request by the host device, the processor performing the process 600 may proceed to 608, wherein appropriate action, as described above, is performed. Note that other methods for determining whether an NTP attack is occurring may be taken at 616 alternatively or in addition to the operations described above.

In 618, the processor performing the process 600 may apply additional firewall rules, including, but not limited to deep packet filtering and detecting internet protocol addresses coming from countries where denial of service attack traffic is suspected of frequently originating. In some embodiments, the on-board processor of the network interface controller may be able to scan the payloads of data packets for viruses, Trojans, malware, or other data to be flagged according to defined legitimacy criteria. If the verification check at 618 fails, the processor performing the process 600 may proceed to 608, wherein appropriate action, as described above, is performed. Otherwise, at 618, if the data packet passes all verification checks, the processor performing the process 600 may proceed to 620 whereupon the network interface controller may then forward the data packet to the host device of the network interface controller. Note that in some embodiments, the network interface controller may perform network monitoring by sampling incoming traffic, and, in 620, rather than forwarding the data packet to the host device of the network interface controller, may forward (i.e., re-route) the data packet to another computing device with less network latency than the host device (i.e., network load balancing) as described above.

Note that where the data packet may be encrypted, such as by transport layer security (TLS) or secure sockets layer (SSL), in some embodiments, the network interface controller of the present disclosure may be further configured to perform decryption such as SSL offloading through SSL acceleration before performing some or all of the operations of the process 600. In other words, in this embodiment, the network interface controller may perform SSL processing to perform SSL handshakes to agree on symmetric or asymmetric keys and perform decryption on the data packet in order to perform deep packet filtering and/or other filtering checks. Note that the operations performed in 606-618 may be performed in various orders, including in parallel.

In at least one embodiment, the network interface controller of the present disclosure may be configured to receive updates through an out-of-band management channel. Out-of-band management provides the ability to modify and update the configuration of the network interface controller through a network, physically-separated connection, or other communication channel independent from the software running on the host device of the network interface controller. Among other advantages, out-of-band management on a network interface controller provides clients with the ability to update a network interface controller in the event that the host device, such as a server, is non-responsive as a result of a denial of service attack. For example, a system administrator of a data center may be able to update the internet protocol tables in the memory of the network interface controller by connecting to the network interface controller via an interface, such as a telnet session or graphical user interface, and upload new internet protocol tables and/or firewall rules, or flash the network interface controller with a new basic input/output system (BIOS) to aid in mitigation of denial of service attacks.

In at least another embodiment, multiple network interface controllers may be configured in a batch operation. An advantage of such an embodiment could be that a large data center utilizing many network interface controllers of the present disclosure may be able to save time and expense by providing multiple network interface controllers in the data center with updated internet protocol tables and firewall rules rather than having to update each network interface controller separately. In some embodiments, network interface controllers in some computing devices may be configured with different internet protocol tables and firewall rules than network interface controllers in other computing devices. As another embodiment, usable in combination with other embodiments, a customer of a computing resource service provider, such as the computing resource service provider computing resource service provider 802 described in conjunction with FIG. 8, may have access to perform out-of-band management on one or more network interface controllers within a server hosting services for the customer. For example, a customer may have a need to protect the customer's website from one or more potential attackers known by the customer but not configured to be blocked by the network interface controllers of the servers hosting the customer's website. In such an example, the customer may be able to perform out-of-band management remotely to add the one or more potential attackers to the internet protocol tables and/or other firewall rules of the network interface controllers of the servers. In some embodiments, such out-of-band management may be able to maintain separate internet protocol tables and firewall rules for different instances, such as separate virtual computer system service 808 instances as described in conjunction with FIG. 8, executing on one or more servers.

In some embodiments, network interface controllers of the type described in the present disclosure may communicate with other similar network interface controllers on the network through an out-of-band management channel. In such an embodiment, a network interface controller with updated internet protocol tables and firewall rules may propagate the most recent internet protocol tables and firewall rules to other network interface controllers through the out-of-band management channel. An advantage of embodiments with this capability may be that a large data center utilizing many network interface controllers of the present disclosure may be able to save time and expense by only updating a single network interface controller and the single network interface controller may push out the updates to the other network interface controllers without human intervention. Another advantage of embodiments of network interface controllers with the capability to communicate with each other through an out-of-band management channel may be that one network interface controller may be able to alert other network interface controllers of a detected denial of service attack and thereby prepare the other network interface controllers for the attack with updated detection and mitigation information.

Figure 7:
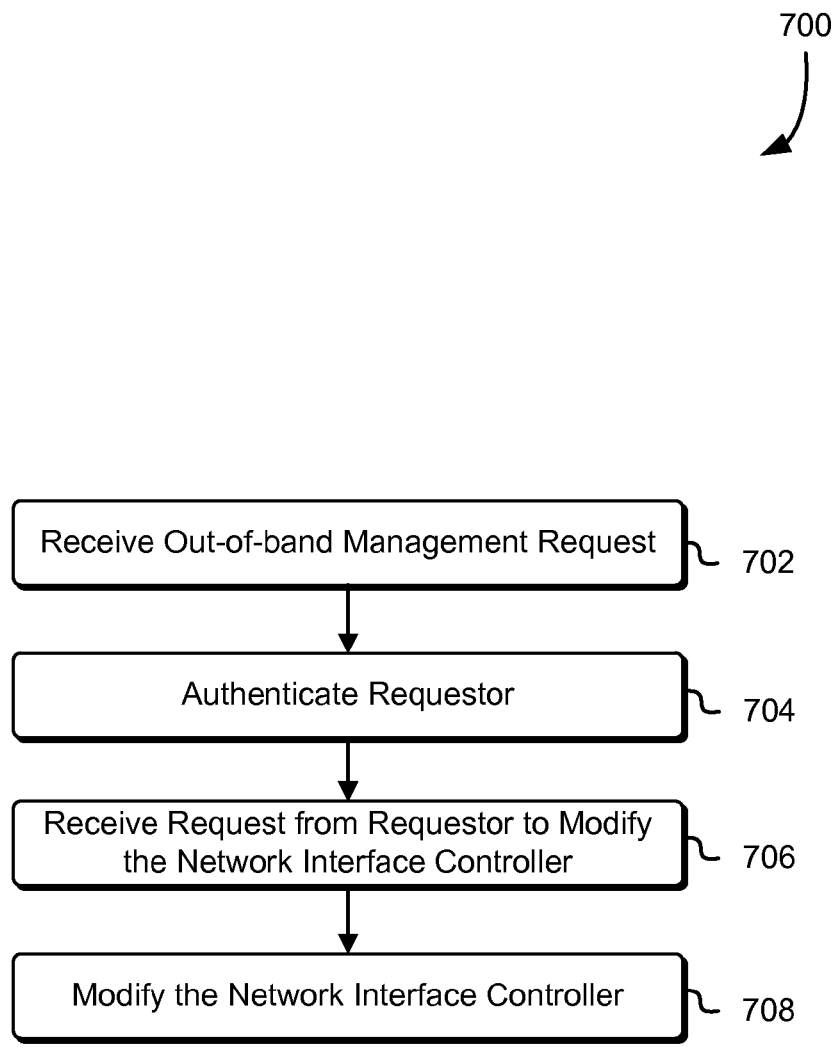
FIG. 7 is a block diagram that illustrates an example of out-of-band management of a network interface controller in accordance with at least one embodiment.

In other embodiments, the network interface controllers of the present disclosure may be at least one level of a multi-level filtering process. For example, in a data center, dedicated devices and software may be utilized to perform certain types of coarse-grained denial of service mitigation, such as detecting and mitigating NTP reflection attacks or SNMP reflection attacks, while computing devices hosting network interface controllers of the present disclosure may comprise a second-tier of more fine-grained denial of service attack mitigation, such as comparing source internet protocol information in packet headers to internet protocol tables and domain filtering, as described above. In some embodiments, two or more network interface controllers of the present disclosure may be present within a single host computing device and may be in communication with each other. In such an embodiment, each network card may perform differing amounts and types of filtering at different tiers of a multi-level filtering process. For example, a first network interface controller may perform a coarse-grained filtering, passing packets that are not filtered out to a second network interface controller for more fine-grained filtering, which may in turn pass packets that are not filtered out to a third network interface controller for even finer-grained filtering, and so on, with the final network interface controller providing packets that pass the legitimacy criteria to the host computing device. FIG. 7 is a block diagram illustrating an example of a process 700 for modifying the configuration of a network interface controller in accordance with various embodiments. The process 700 may be implemented by a network interface controller of the present disclosure hosted by any suitable system such as a data server, web server, personal computing device, router, switch, or any electronic client device such as the computing device 400 described in conjunction with FIG. 4 and the electronic client device 902 described in conjunction with FIG. 9. The process 700 includes a series of operations wherein a client makes a request to perform an out-of-band management operation on a network interface controller of the present disclosure, such as network interface controller 202 of FIG. 2. In 702, a network interface controller receives a request from a client through an out-of-band management channel to perform a management operation on the network interface controller. As noted, the request may arrive through a network communication channel, a physically-separated connection, or other communications channel. Although the network interface controller of the present disclosure may be managed remotely from the device hosting the network interface controller, in at least some examples the network interface controller may be managed through a shell application or other interface executing on the host device. The client making the request may be an individual or may be a service, such as a service executing under the control of a computing resource services provider.

In 704, the network interface controller authenticates the request by the requestor. Authentication may occur according to a variety of established methods, such as verification by submission of credentials such as a username and password, or a digital signature utilizing public-private key encryption. After the requestor has been determined to have sufficient permissions, the network interface controller may generate an access token performing actions the requestor is authorized to perform, such as in 708 below.

In 706, the requestor submits a request to change the configuration of the network interface controller. Such configuration changes include, but are not limited to, flashing the BIOS of the network interface controller, updating the internet protocol tables of the network interface controller, updating firewall rules of the network interface controller, creation of new firewall rules for the network interface controller and changing a password of a user of the network interface controller. If the requestor is authorized to perform the requested action, the device performing the process 700 proceeds to 708. In 708, the network interface controller performs the requested modification. For example, the requestor may have submitted one or more internet protocol addresses to the internet protocol table block list, the requestor may have selected to upload a file containing a revised internet protocol table, or the requestor may have identified internet protocol addresses to log if detected by the network interface controller.

Figure 8:
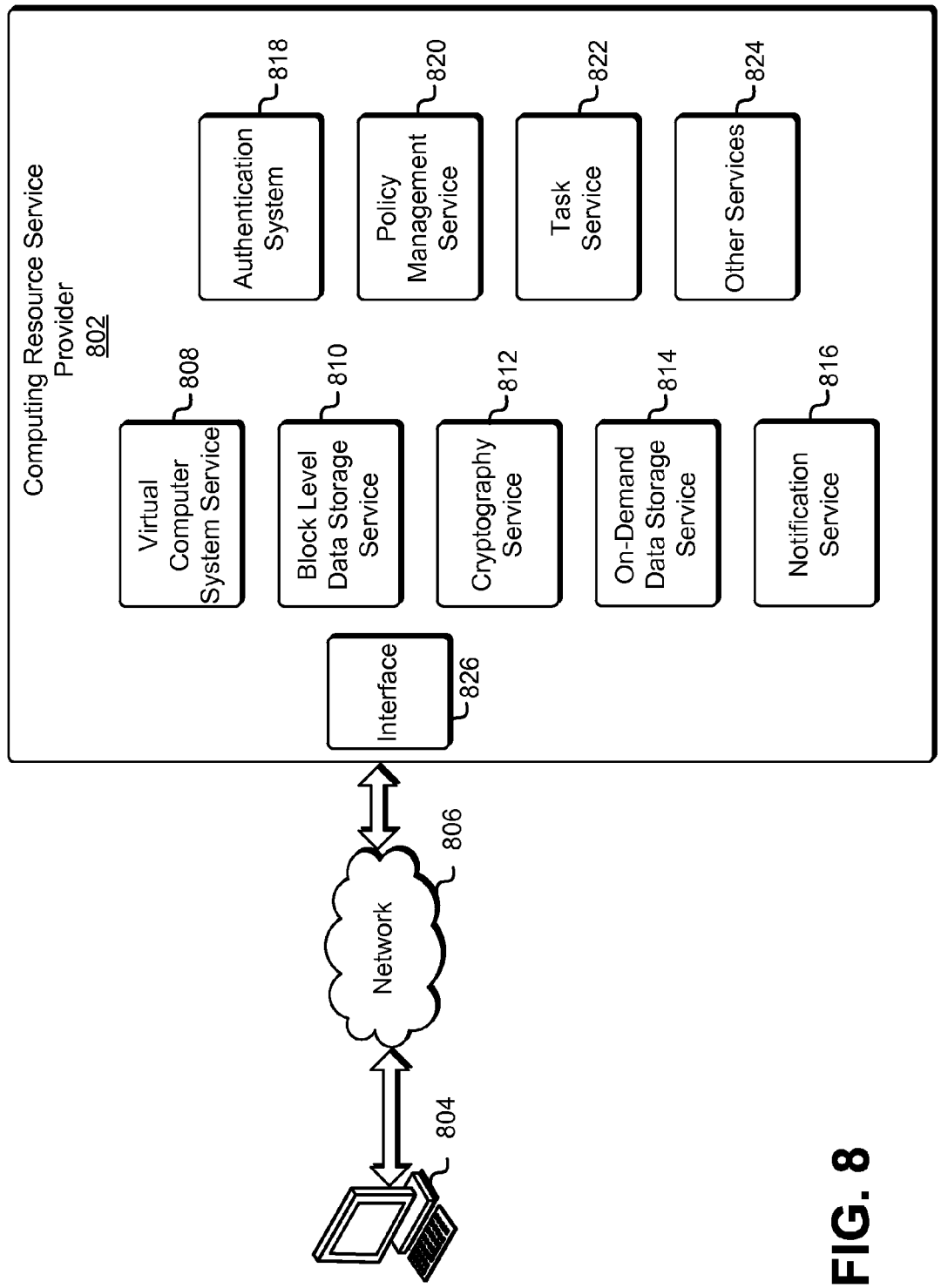
FIG. 8 illustrates an example of a customer connected to a computing resource service provider.

FIG. 8 shows an example of a customer connected to a computing resource service provider in accordance with at least one embodiment. The computing resource service provider 802 may provide a variety of services to the customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more embodiments described herein or a variation thereof.

The computing resource service provider 802 may provide various computing resource services to its customers. The services provided by the computing resource service provider 802, in this example, include a virtual computer system service 808, a block-level data storage service 810, a cryptography service 812, an on-demand data storage service 814, a notification service 816, an authentication system 818, a policy management service 820, a task service 822 and one or more other services 824. It is noted that not all embodiments described herein include the services 808-824 described with reference to FIG. 8 and additional services may be provided in addition to or as an alternative to services explicitly described herein. As described herein, each of the services 808-824 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block level data storage service 810).

The virtual computer system service 808 may be a collection of computing resources configured to instantiate virtual machine instances on behalf of the customer 804. The customer 804 may interact with the virtual computer system service 808 (via appropriately configured and authenticated API calls) to provision and operate virtual computer systems that are instantiated on physical computing devices hosted and operated by the computing resource service provider 802. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that collectively operate to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. A block-level storage device may enable the persistent storage of data used/generated by a corresponding virtual computer system where the virtual computer system service 808 may only provide ephemeral data storage.

The computing resource service provider 802 also includes a cryptography service 812. The cryptography service 812 may utilize one or more storage services of the computing resource service provider 802 to store keys of the customers in encrypted form, whereby the keys may be usable to decrypt customer 812 keys accessible only to particular devices of the cryptography service 812.

The computing resource service provider 802 further includes an on-demand data storage service 814. The on-demand data storage service 814 may be a collection of computing resources configured to synchronously process requests to store and/or access data. The on-demand data storage service 814 may operate using computing resources (e.g., databases) that enable the on-demand data storage service 814 to locate and retrieve data quickly, so as to allow data to be provided in responses to requests for the data. For example, the on-demand data storage service 814 may maintain stored data in a manner such that, when a request for a data object is retrieved, the data object can be provided (or streaming of the data object can be initiated) in a response to the request. As noted, data stored in the on-demand data storage service 814 may be organized into data objects. The data objects may have arbitrary sizes except, perhaps, for certain constraints on size. Thus, the on-demand data storage service 814 may store numerous data objects of varying sizes. The on-demand data storage service 814 may operate as a key value store that associates data objects with identifiers of the data objects which may be used by the customer 804 to retrieve or perform other operations in connection with the data objects stored by the on-demand data storage service 814.

In the environment illustrated in FIG. 8, a notification service 816 is included. The notification service 816 may comprise a collection of computing resources collectively configured to provide a web service or other interface and browser-based management console. The management console can be used to configure topics for which customers seek to receive notifications for, configure applications (or people), subscribe clients to the topics, publish messages, or configure delivery of the messages over clients' protocol of choice (i.e., hypertext transfer protocol (HTTP), e-mail and short message service (SMS), among others). The notification service 816 may provide notifications to clients using a "push" mechanism without the need to periodically check or "poll" for new information and updates. The notification service 816 may further be used for various purposes such as monitoring applications executing in the virtual computer system service 808, workflow systems, time-sensitive information updates, mobile applications, and many others.

As illustrated in FIG. 8, the computing resource service provider 802, in various embodiments, includes an authentication system 818 and a policy management service 820. The authentication system 818, in an embodiment, is a computer system (i.e., collection of computing resources) configured to perform operations involved in authentication of users of the customer. For instance, one of the services 808-816 and 820-824 may provide information from a user to the authentication service 818 to receive information in return that indicates whether or not the user requests are authentic.

The policy management service 820, in an embodiment, is a computer system configured to manage policies on behalf of customers (such as customer 804) of the computing resource service provider 802. The policy management service 820 may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 802, in various embodiments, is also equipped with a task service 822. The task service 822 is configured to receive a task package from the customer 804 and enable executing tasks as dictated by the task package. The task service 822 may be configured to use any resource of the computing resource service provider 802, such as one or more instantiated virtual machines or virtual hosts, for executing the task. The task service 824 may configure the one or more instantiated virtual machines or virtual hosts to operate using a selected operating system and/or a selected execution application in accordance with a requirement of the customer 804.

The computing resource service provider 802 additionally maintains one or more other services 824 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services and/or other services.

Figure 9:
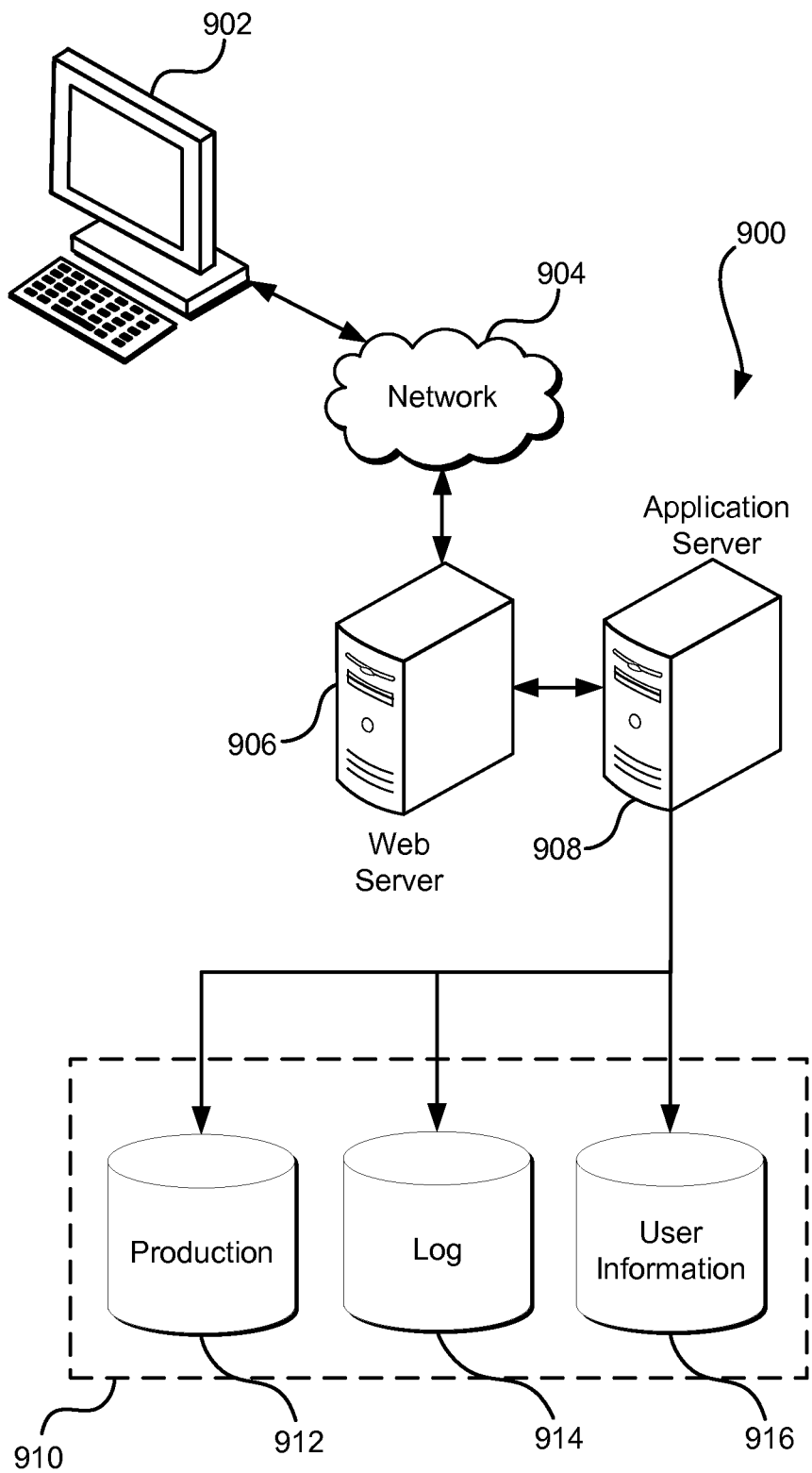
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other similar network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of a network interface controller configured with executable instructions,
   receiving, at the network interface controller, an inbound data packet destined for a corresponding network interface of a computer system having a first processor;
   extracting, by a second processor of the network interface controller, a set of field values from the inbound data packet;
   determining, using the processor of the network interface controller, whether the set of field values satisfies network traffic legitimacy criteria;
   based at least in part on the determination, performing a mitigation action when the network traffic legitimacy criteria are not satisfied;
   receiving, at the network interface controller, outbound data from the first processor; and
   sending the outbound data as a set of outbound data packets, bypassing the second processor of the network interface controller.

2. The computer-implemented method of claim 1, wherein the mitigation action comprises at least one of dropping the inbound data packet, rate limiting a source internet protocol address, logging protocol headers, logging network statistics, or tarpitting the source internet protocol address.

3. The computer-implemented method of claim 1, wherein the network traffic legitimacy criteria is usable to indicate whether the inbound data packet is at least a portion of a denial of service attack.

4. A network interface controller in a computing device, the network interface controller comprising:
   a first processor configured to:
      receive a first packet;
      extract a set of field values from the first packet;
      determine whether the set of field values satisfies a set of one or more network traffic legitimacy criteria; and
      based at least in part on the determination, provide the first packet to the computing device if the set of one or more network traffic legitimacy criteria is satisfied, or else perform a mitigation action if the set of one or more network traffic legitimacy criteria is not satisfied; and
   a media access control layer and a physical layer configured to:
      receive data from the computing device; and
      send the data as at least one second packet, bypassing the first processor.

5. The network interface controller of claim 4, wherein the mitigation action performed comprises dropping the first packet.

6. The network interface controller of claim 4, wherein the mitigation action performed comprises rate limiting a source internet protocol address.

7. The network interface controller of claim 4, wherein the mitigation action performed comprises tarpitting a source internet protocol address.

8. The network interface controller of claim 4, wherein the mitigation action performed comprises logging a protocol header of the first packet.

9. The network interface controller of claim 4, wherein the set of one or more network traffic legitimacy criteria is determined to be satisfied at least in part by comparing a source internet protocol address against internet protocol tables stored in a memory of the network interface controller.

10. The network interface controller of claim 4, wherein the set of one or more network traffic legitimacy criteria is determined to be satisfied at least in part by whether a source internet protocol address of the first packet is traceable to a specific country.

11. The network interface controller of claim 4, wherein the processor is further configured to perform secure sockets layer offloading.

12. The network interface controller of claim 4, wherein the network interface controller is further configured to:
   receive a first request from a client to manage the network interface controller;
   authenticate the client to yield an authenticated client;
   receive a second request from the authenticated client to modify the configuration of the network interface controller; and
   modify the network interface controller based at least in part on the second request.

13. The network interface controller of claim 12, wherein the modification comprises an update to one or more network traffic legitimacy criteria of the set of one or more network traffic legitimacy criteria.

14. The network interface controller of claim 12, wherein the client is a customer of a computing resource service provider.

15. A non-transitory computer-readable storage medium having collectively stored thereon executable instructions that, when executed by one or more on-board processors of a network interface controller, cause the network interface controller to at least:
   receive, at the network interface controller, an inbound data packet;
   extract, using the one or more on-board processors of the network interface controller, a set of field values from the inbound data packet;
   apply, using the one or more on-board processors of the network interface controller, a set of one or more network traffic legitimacy criteria to the set of field values;
   based at least in part on a result of the application of the set of one or more network traffic legitimacy criteria, provide the packet to a destination computing device or perform a mitigation action;
   receive, at the network interface controller, outbound data from a computing device, the computing device comprising at least one second processor; and
   send the outbound data as a set of outbound data packets, without applying, using the one or more on-board processors, the set of one or more network traffic legitimacy criteria to the outbound data.

16. The non-transitory computer-readable storage medium of claim 15, wherein the instructions further comprise instructions that, when executed by the one or more processors, cause the network interface controller to update one or more network legitimacy criteria of the set of one or more network traffic legitimacy criteria according to instructions received through an out-of-band management channel.

17. The non-transitory computer-readable storage medium of claim 15, wherein:
the set of one or more network traffic legitimacy criteria includes a first set of network traffic legitimacy criteria and a second set of network traffic legitimacy criteria; and
the instructions that cause the network interface controller to apply the set of one or more network traffic legitimacy criteria further comprise instructions that cause the network interface controller to:
apply the first set of network traffic legitimacy criteria to a first virtual computer system instance of a customer of a computing resource service provider; and
apply the second set of one or more network traffic legitimacy criteria to a second virtual computer system instance of a different customer of the computing resource service provider.

18. The non-transitory computer-readable storage medium of claim 15, wherein the mitigation action comprises forwarding the inbound packet to a different computing device than the destination computing device.

19. The non-transitory computer-readable storage medium of claim 15, wherein the instructions further cause the network interface controller to log network traffic statistics.

20. A system comprising a plurality of computing devices in a distributed computing environment, wherein individual computing devices of the plurality of computing devices have at least one network interface controller, the at least one network interface controller having a processor configured to:
receive a packet;
extract a set of field values from the packet;
determine whether the set of field values satisfies a set of one or more network traffic legitimacy criteria; and
based at least in part on the determination, provide the packet to an individual computing device of the at least one network interface controller if the set of one or more network traffic legitimacy criteria is satisfied, or else perform a mitigation action if the set of one or more network traffic legitimacy criteria is not satisfied.

* * * * *